US012577929B2

(12) United States Patent
Tanabe et al.

(10) Patent No.: US 12,577,929 B2
(45) Date of Patent: Mar. 17, 2026

(54) EASY ENGINE STARTING SYSTEM

(71) Applicants: YAMABIKO CORPORATION, Tokyo (JP); OPPAMA INDUSTRY CO., LTD., Kanagawa (JP)

(72) Inventors: Akira Tanabe, Tokyo (JP); Tamotsu Saito, Tokyo (JP); Ryosuke Imai, Tokyo (JP); Ryosuke Kajiyama, Kanagawa (JP)

(73) Assignees: YAMABIKO CORPORATION, Tokyo (JP); OPPAMA INDUSTRY CO., LTD., Kanagawa (JP)

( * ) Notice: Subject to any disclaimer, the term of this patent is extended or adjusted under 35 U.S.C. 154(b) by 150 days.

(21) Appl. No.: 18/554,632

(22) PCT Filed: Apr. 26, 2021

(86) PCT No.: PCT/JP2021/016648
§ 371 (c)(1),
(2) Date: Oct. 10, 2023

(87) PCT Pub. No.: WO2022/230023
PCT Pub. Date: Nov. 3, 2022

(65) Prior Publication Data
US 2024/0044309 A1    Feb. 8, 2024

(51) Int. Cl.
*F02D 41/06*      (2006.01)
*F02N 3/02*       (2006.01)
*F16D 43/06*      (2006.01)
(52) U.S. Cl.
CPC .............. *F02N 3/02* (2013.01); *F16D 43/06* (2013.01)

(58) Field of Classification Search
CPC ............................. F02D 41/062; F02D 41/022
See application file for complete search history.

(56) References Cited

U.S. PATENT DOCUMENTS

| | | | | |
|---|---|---|---|---|
| 4,610,231 | A * | 9/1986 | Nakata ................... | F02P 5/1558 |
| | | | | 123/406.53 |
| 2009/0101105 | A1 * | 4/2009 | Tamamoto .............. | F02D 37/02 |
| | | | | 123/339.11 |
| 2014/0034011 | A1 * | 2/2014 | Gegg ...................... | F02B 63/02 |
| | | | | 123/406.11 |
| 2014/0299098 | A1 * | 10/2014 | Raffenberg ............. | F02P 5/145 |
| | | | | 123/406.12 |
| 2014/0360467 | A1 | 12/2014 | Osburg et al. | |

(Continued)

FOREIGN PATENT DOCUMENTS

| | | |
|---|---|---|
| EP | 2891785 A1 | 7/2015 |
| JP | H10-131808 A | 5/1998 |

(Continued)

*Primary Examiner* — Long T Tran
(74) *Attorney, Agent, or Firm* — HAUPTMAN HAM, LLP

(57) ABSTRACT

Provided is an easy engine starting system including: an engine; a centrifugal clutch configured to transmit a driving force of the engine to a driven device; and a control device configured to adjust output of the engine. When the engine is to be started, the engine is accelerated at start engine output which enables the engine to reach a rotation speed higher than a clutch-in rotation speed. The control device has suppression control of suppressing, at the start engine output, the rotation speed to a rotation speed equal to or lower than the clutch-in rotation speed.

14 Claims, 7 Drawing Sheets

(56) References Cited

U.S. PATENT DOCUMENTS

| | | | |
|---|---|---|---|
| 2015/0174751 A1* | 6/2015 | Gorenflo | F02D 41/022 173/1 |
| 2015/0184595 A1* | 7/2015 | Honzawa | F02M 35/1017 123/41.58 |
| 2016/0273467 A1* | 9/2016 | Kawano | F02D 41/34 |
| 2018/0133822 A1* | 5/2018 | Naganuma | B27B 17/02 |
| 2018/0156160 A1 | 6/2018 | Nonaka et al. | |
| 2019/0085779 A1* | 3/2019 | Klatt | F02B 63/02 |
| 2020/0040863 A1* | 2/2020 | Klatt | F02D 41/062 |

FOREIGN PATENT DOCUMENTS

| | | |
|---|---|---|
| JP | 2016-079843 A | 5/2016 |
| JP | 2018-091353 A | 6/2018 |
| JP | 2018-204496 A | 12/2018 |
| JP | 2020-012448 A | 1/2020 |

* cited by examiner 70    86

82  84  80  72

⇧ FUEL

70    ⇩ AIR  76

θ

72

74

EASY ENGINE STARTING SYSTEM

RELATED APPLICATIONS

The present application is a National Phase of International Application No. PCT/JP2021/016648 filed Apr. 26, 2021.

TECHNICAL FIELD

The present invention relates to an easy engine starting system capable of easily starting an engine.

BACKGROUND ART

A related-art manual-recoil type working machine includes a lift-up member, and uses a mechanism of the lift-up member to determine both of an amount of air and an amount of fuel to be supplied to an engine. In this manual-recoil type working machine, when the engine is to be started, the lift-up member is operated to increase a throttle opening degree to an opening degree corresponding to such output that clutch-in does not occur, to thereby start the engine.
[PTL 1] JP 10-131808 A
The related-art manual-recoil type working machine includes the lift-up member, and controls the amount of the air and the amount of the fuel within an output range in which the clutch-in does not occur. Thus, an effect is limited, and the start of the engine requires time in some cases.

DISCLOSURE OF INVENTION

The present invention has been made in view of the above-mentioned problem, and has an object to provide an easy engine starting system capable of quickly and appropriately starting an engine even when the start of the engine is of a manual type such as a manual-recoil type working machine.

A feature of an easy engine starting system according to one embodiment of the present invention resides in including: an engine; a centrifugal clutch configured to transmit a driving force of the engine to a driven device; and a control device configured to adjust output of the engine, and in that, when the engine is to be started, the engine is accelerated at start engine output which enables the engine to reach a rotation speed higher than a clutch-in rotation speed, and in that the control device has suppression control of suppressing, at the start engine output, the rotation speed to a rotation speed equal to or lower than the clutch-in rotation speed.

Advantageous Effects of Invention

According to the present invention, the engine can quickly and appropriately be started even when the start of the engine is of the manual type.

DESCRIPTION OF EMBODIMENTS

≪≪Summary of Embodiments≫≫

Figure 1:
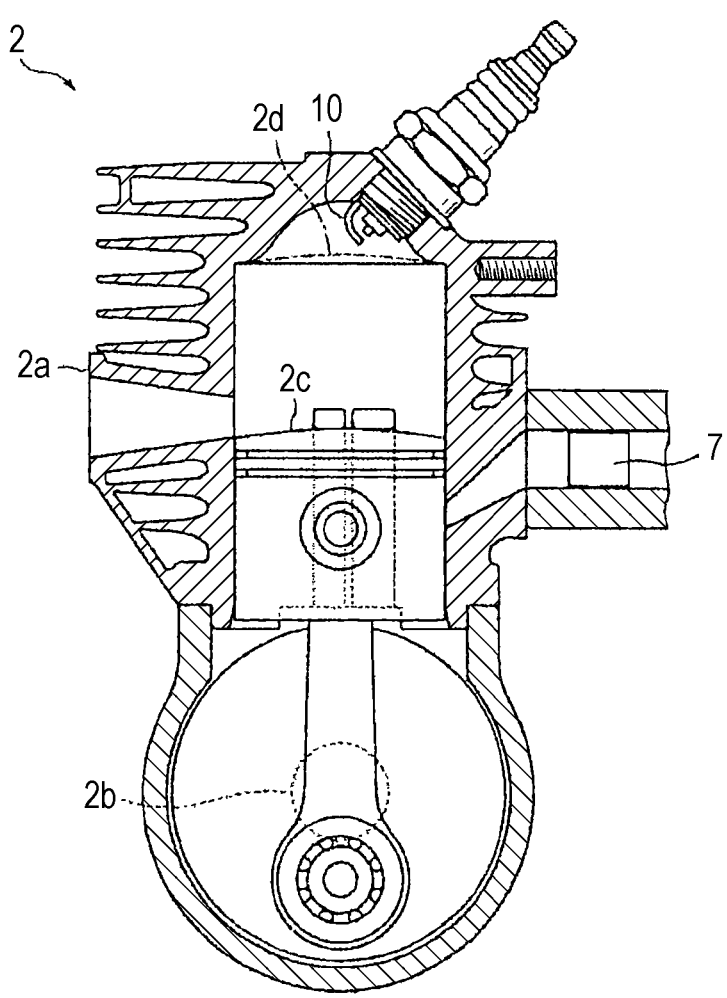
FIG. 1 is a schematic view of an engine in an embodiment of the present invention.

≪First Aspect≫
According to a first aspect, there is provided an easy engine starting system including: an engine; a centrifugal clutch configured to transmit a driving force of the engine to a driven device; and a control device configured to adjust output of the engine, wherein, when the engine is to be started, the engine is accelerated at start engine output which enables the engine to reach a rotation speed higher than a clutch-in rotation speed (the clutch-in rotation speed usually represents a rotation speed at which the clutch is started), and wherein the control device has suppression control of suppressing, at the start engine output, the rotation speed to a rotation speed equal to or lower than the clutch-in rotation speed.

The easy engine starting system according to the first aspect includes the engine, the centrifugal clutch, and the control device.

When the engine is to be started, the engine is accelerated at the start engine output which enables the engine to reach a rotation speed higher than the clutch-in rotation speed. For example, the engine is enabled to reach a rotation speed higher than the clutch-in rotation speed by controlling an amount of air and an amount of fuel supplied to the engine when the engine is to be started.

It is only required for the engine to be able to reach the clutch-in rotation speed, and the engine does not actually reach the clutch-in rotation speed. Thus, the suppression control suppresses the rotation speed to a rotation speed equal to or lower than the clutch-in rotation speed.

It is possible to simplify an operation for starting the engine (eliminate a choke operation, for example) by executing the control at the time when the engine is to be started through use of the start engine output and the suppression control, and even a user having a low skill can appropriately start the engine. Moreover, the engine can quickly be started, and can be brought into a usable state in a short time.
≪Second Aspect≫
According to a second aspect, in the first aspect, the easy engine starting system further includes a throttle valve configured to adjust an intake air amount supplied to a combustion chamber of the engine, and, at the start engine output, a throttle opening degree of the throttle valve is adjusted so as to enable the engine to reach a rotation speed higher than the clutch-in rotation speed.

The amount of the air supplied to the combustion chamber of the engine is adjusted, and hence it is possible to enable the engine to appropriately reach a rotation speed higher than the clutch-in rotation speed.

«Third Aspect»

According to a third aspect, in the second aspect, the output of the engine is from 0.5 kW to 2 kW, and the throttle opening degree has a target corresponding to a rotation speed equal to or higher than the clutch-in rotation speed and equal to or lower than twice of the clutch-in rotation speed.

With this configuration, the rotation speed of the engine can quickly be increased.

«Fourth Aspect»

According to a fourth aspect, in the third aspect, the throttle opening degree has a target corresponding to a rotation speed equal to or higher than the clutch-in rotation speed and from 1.0 time to 1.6 times of the clutch-in rotation speed.

With this configuration, good starting capability and good suppression controllability can be achieved.

«Fifth Aspect»

According to a fifth aspect, in the fourth aspect, the throttle opening degree has a target corresponding to a rotation speed equal to or higher than the clutch-in rotation speed and from 1.0 time to 1.3 times of the clutch-in rotation speed.

With this configuration, better starting capability and better suppression controllability can be achieved.

«Sixth Aspect»

According to a sixth aspect, in the first to fifth aspects, easy engine starting system further includes a detection unit configured to detect the rotation speed of the engine, and the suppression control is feedback control of determining an ignition timing from a deviation between a target rotation speed and the detected rotation speed.

The rotation speed of the engine is detected, and the control is executed based on the difference from the target rotation speed. Thus, the rotation speed of the engine can quickly be stabilized while the rotation speed of the engine can quickly be increased.

«Seventh Aspect»

According to a seventh aspect, in the sixth aspect, the feedback control is started when at least one of the detected rotation speed, the rotation speed, or a time satisfies a predetermined condition after the engine is started.

It is possible to allow the control to transition to the feedback control at an appropriate timing.

«Eighth Aspect»

According to an eighth aspect, in the sixth or seventh aspect, the feedback control has: first feedback control of executing feedback control such that the rotation speed falls within a first rotation speed range; and second feedback control of executing, after the first feedback control, feedback control such that the rotation speed falls within a second rotation speed range wider than the first rotation speed range.

The rotation speed of the engine is stabilized through use of the first feedback control immediately after the engine start, and then the engine can be brought into a state in which the engine can be quickly accelerated through use of the second feedback control.

«Ninth Aspect»

According to a ninth aspect, in the first to eighth aspects, the engine includes a recoil having a rope to be pulled by hand when the engine is to be started.

With this configuration, even a worker having relatively low physical strength can easily start the engine.

«Tenth Aspect»

According to a tenth aspect, in the ninth aspect, the easy engine starting system further includes a two-stroke engine mounted to a handheld blade working machine.

With this configuration, the engine can easily be started, and the clutch-in does not occur. Thus, the engine can safely be started.

«Eleventh Aspect»

The easy engine starting system further includes a fuel valve configured to adjust an amount of fuel supplied to the combustion chamber of the engine, and, together with the throttle opening degree, an opening degree of the fuel valve is adjusted.

Not only the amount of the air, but also the amount of the fuel is adjusted, and hence the rotation speed of the engine can be controlled such that the rotation speed does not exceed the clutch-in rotation speed while the rotation speed is quickly increased.

«Twelfth Aspect»

The easy engine starting system further includes an operation association mechanism configured to cause the throttle valve and the fuel valve to operate in association with each other.

The control is executed through use of the operation association mechanism, and hence both of the amount of the air and the amount of the fuel can easily be controlled.

«««Details of Embodiments»»»

In the following, an embodiment of the present invention is described with reference to the drawings. «<Configuration of Internal Combustion Engine 2»>

FIG. 1 is a schematic view of the engine in the embodiment. As illustrated in FIG. 1, it is preferred that an internal combustion engine 2 be a two-cycle gasoline engine. The internal combustion engine 2 includes a carburetor 7. The carburetor 7 includes a throttle valve (a rotary portion 72 described later (see FIG. 8A and FIG. 8B)) which adjusts an amount of air-fuel mixture caused to flow into the internal combustion engine 2. The throttle valve is operated by a throttle lever or a choke knob (not shown), for example. As the throttle valve, a throttle valve which has hitherto been known can be used.

The internal combustion engine 2 includes a cylinder 2a, a crankshaft 2b, a piston 2c, and an ignition plug 10. The piston 2c is arranged in the cylinder 2a, and is coupled to the crankshaft 2b. The ignition plug 10 is arranged in a top portion of the cylinder 2a.

The piston 2c moves up to a top dead center position 2d in the compression stroke of the internal combustion engine 2. In general, the ignition plug 10 is effectively operated at a timing before the piston 2c reaches the top dead center position 2d, to thereby combust the air-fuel mixture in the cylinder 2a. A downward propelling force is applied to the piston 2c through the combustion of the air-fuel mixture, to thereby generate a torque on the crankshaft 2b.

The internal combustion engine 2 can be mounted to a working machine or the like. The working machine can be, for example, a mowing robot of an autonomous type, a handheld working machine, or the like.

It is preferred that the internal combustion engine 2 include a recoil having a rope to be pulled by hand when the internal combustion engine 2 is to be started. With this configuration, even a person having relatively low physical strength can easily start the internal combustion engine 2. Moreover, it is preferred that the easy engine start system include a two-stroke engine mounted to a handheld blade working machine. With this configuration, the engine can easily be started, and the clutch-in does not occur. Thus, the engine can safely be started.

5

6

<Output of Internal Combustion Engine 2>

Output of the internal combustion engine 2 refers to a work load of the engine. The output of the internal combustion engine 2 is obtained by multiplying the torque by the rotation speed. Specifically, it is preferred that the output of the internal combustion engine 2 be from 0.5 kW to 2 kW. When the internal combustion engine 2 is used for a lawn mower equipped with a rotary carburetor, it is preferred that the output of the internal combustion engine 2 be from 0.7 kW to 1.4 kW.

«<Configuration of Ignition Device 12»>

Figure 2:
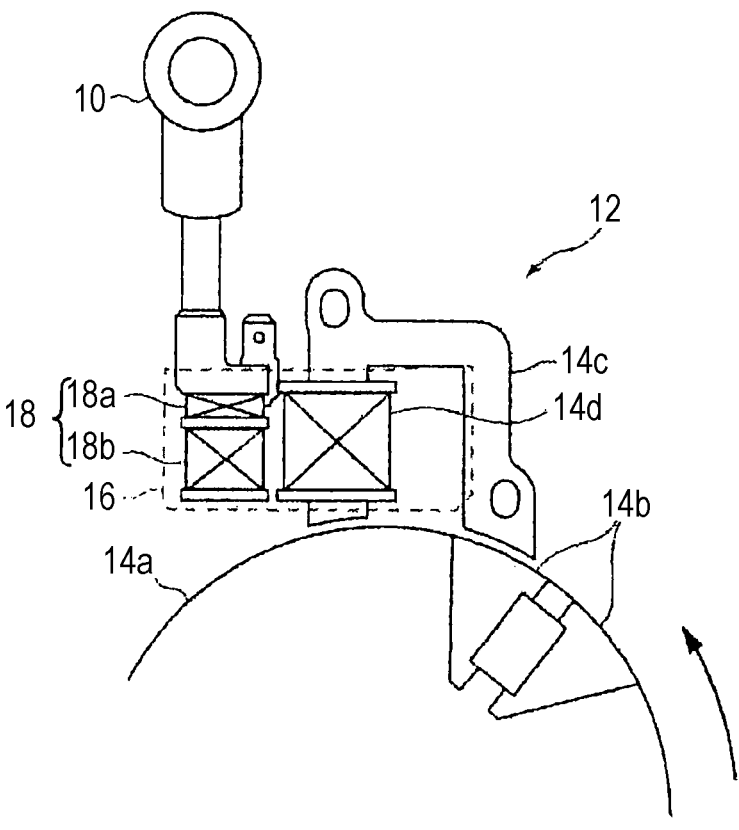
FIG. 2 is a schematic view of an ignition device for the engine in the embodiment.

FIG. 2 is a schematic view of an ignition device for the internal combustion engine 2 in the embodiment. As illustrated in FIG. 2, the internal combustion engine 2 includes an ignition device 12 which operates the ignition plug 10. To the crankshaft (not shown) of the internal combustion engine 2, a flywheel 14a is mounted for associative operation. The ignition device 12 includes a pair of magnets 14b, an iron core 14c, and an input coil 14d.

The pair of magnets 14b are provided on an outer periphery of the flywheel 14a. The iron core 14c has a U shape, and is arranged adjacent to the outer periphery of the flywheel 14a. The input coil 14d is wound around the iron core 14c.

The ignition device 12 includes a control device 16, a primary coil 18a, and a secondary coil 18b. The control device 16 is connected to the input coil 14d. The primary coil 18a is connected to the control device 16. The secondary coil 18b is connected to the ignition plug 10.

«<Configuration of Control Device 16»>

Figure 3:
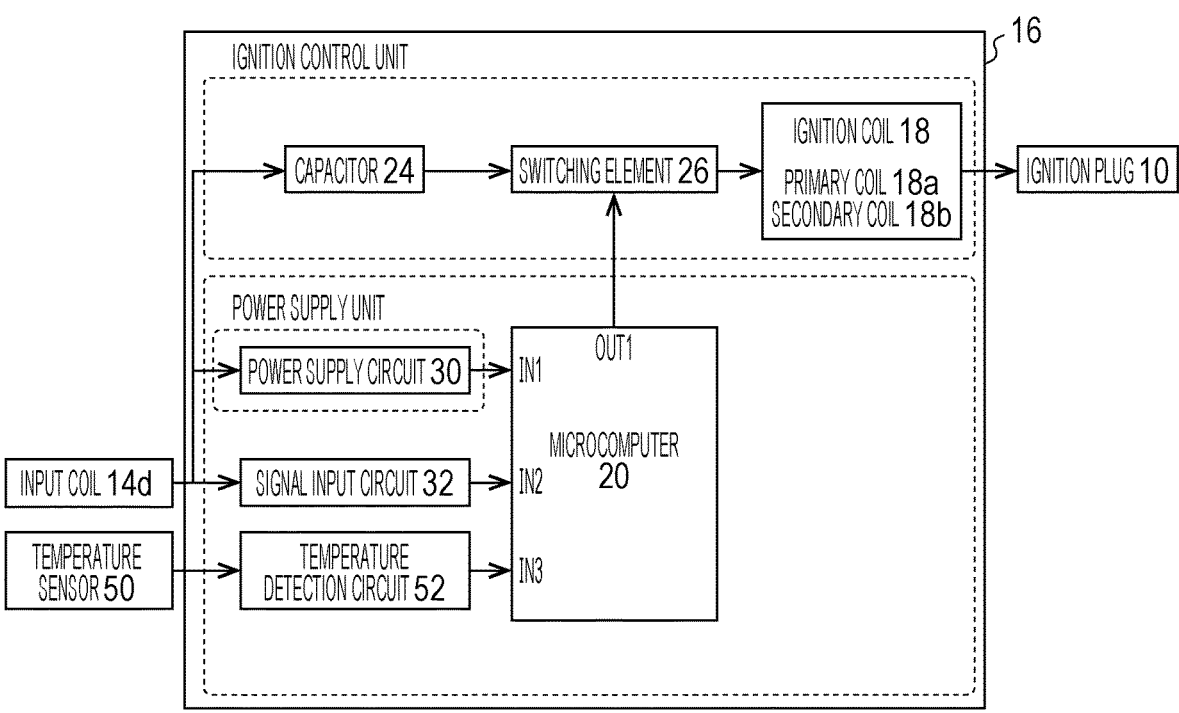
FIG. 3 is a circuit block diagram of a control device (16).

FIG. 3 is a circuit block diagram for illustrating a circuit configuration of the control device 16. As illustrated in FIG. 3, the control device 16 includes a capacitor 24, a switching element 26, a signal input circuit 32, a microcomputer 20, a power supply circuit 30, a temperature sensor 50, and a temperature detection circuit 52. In FIG. 3, the above-mentioned primary coil 18a and secondary coil 18b are illustrated as an ignition coil 18.

When the internal combustion engine 2 operates, the crankshaft rotates, and the pair of magnets 14b attached to the flywheel 14a pass through a vicinity of the iron core 14c having the U shape. As a result, a voltage is induced in the input coil 14d, and is supplied to the microcomputer 20.

«Supply of Electric Power»

The voltage induced in the input coil 14d is supplied, as a power supply voltage, to the microcomputer 20 from an IN1 terminal of the microcomputer 20 via the power supply circuit 30. The power supply circuit 30 is formed of a rectifier circuit, a smoothing circuit, and the like (not shown). As a result, a stable power supply voltage is supplied to the microcomputer 20.

«Control Signal»

The voltage induced in the input coil 14d is supplied, as a control signal, to the microcomputer 20 from an IN2 terminal of the microcomputer 20 via the signal input circuit 32. The signal input circuit 32 is formed of a waveform shaping circuit and the like (not shown). As a result, the control signal is supplied to the microcomputer 20. The control signal is a signal including one or more pulses per one rotation of the crankshaft. The control signal functions as a reference signal for generating an ignition control signal.

«Ignition Control»

The microcomputer 20 detects or calculates the number of rotations (rotation speed) and an angular position of the internal combustion engine 2 based on the control signal supplied via the signal input circuit 32. The microcomputer 20 generates the ignition control signal based on a detection result and a calculation result, and outputs the ignition control signal from an OUT1 terminal to the switching element 26.

The switching element 26 is formed of, for example, thyristor. The switching element 26 is connected to the OUT1 terminal of the microcomputer 20. When the ignition control signal output from the OUT1 terminal of the microcomputer 20 is LOW, the switching element 26 is in a non-current-carrying state. When the ignition control signal output from the OUT1 terminal of the microcomputer 20 is HIGH, the switching element 26 is in a current-carrying state.

When the ignition control signal output from the microcomputer 20 is set to LOW, to thereby bring the switching element 26 into the non-current-carrying state, the capacitor 24 is charged by the voltage induced in the input coil 14d. When an ignition timing of the ignition plug 10 is reached, the ignition control signal output from the microcomputer 20 is set to HIGH, to thereby bring the switching element 26 into the current-carrying state. As a result, the capacitor 24 is discharged, to thereby cause a current to flow through the primary coil 18a of the ignition coil 18. The current flowing through the primary coil 18a generates a high-voltage pulse in the secondary coil 18b of the ignition coil 18, to thereby operate the ignition plug 10.

«Temperature Sensor 50 and Temperature Detection Circuit 52»

The temperature sensor 50 detects the temperature of the internal combustion engine 2, to thereby output a detection signal. The temperature sensor 50 is connected to the temperature detection circuit 52. The temperature detection circuit 52 supplies the detection signal to the microcomputer 20. The detection signal is digitized by the temperature detection circuit 52 or the microcomputer 20. The temperature detection circuit 52 is connected to an IN3 terminal of the microcomputer 20. With this configuration, the microcomputer 20 can acquire the temperature of the internal combustion engine 2.

«<Engine Start-time Control»>

Figure 4:
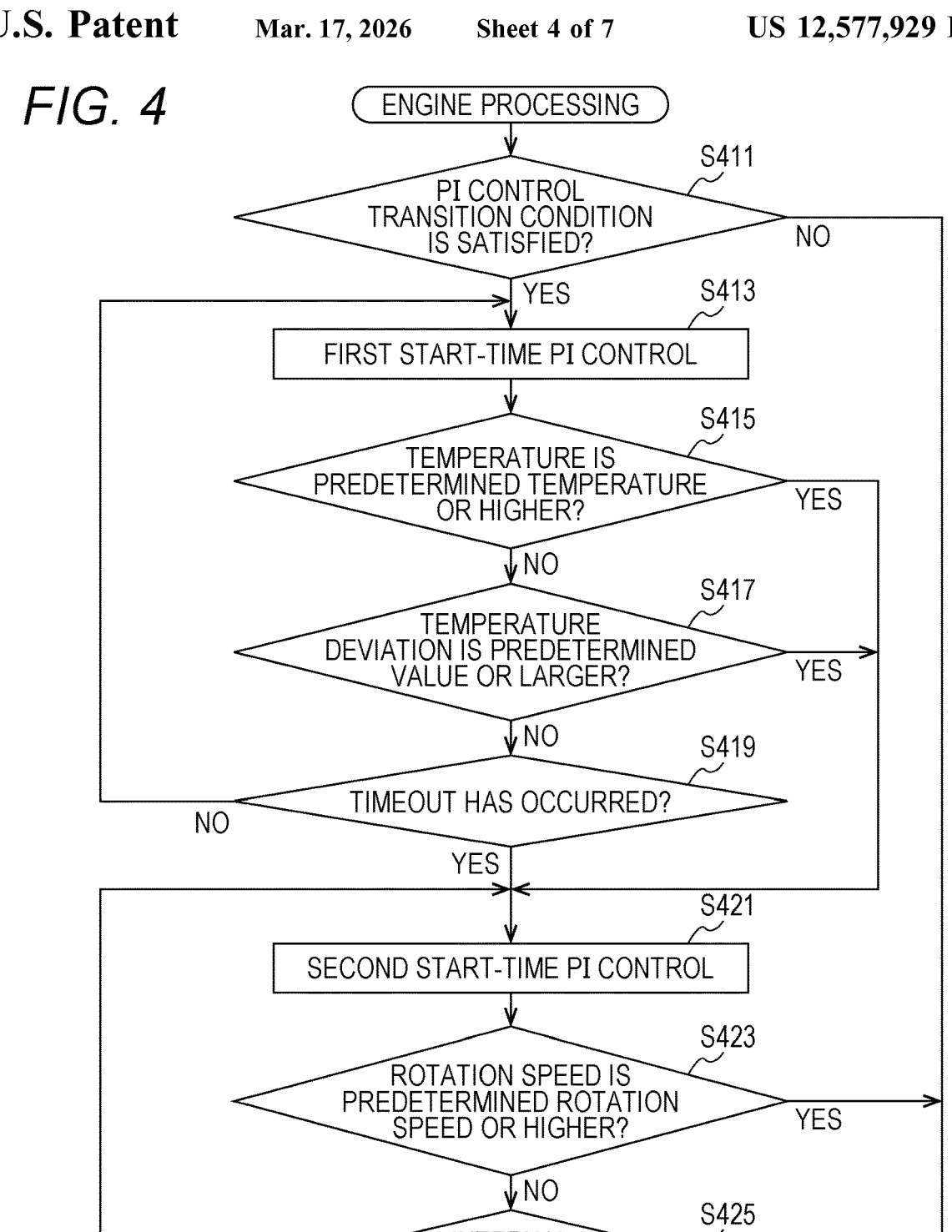
FIG. 4 is a flowchart for illustrating processing of control executed when an internal combustion engine (2) is started.
Figure 5:
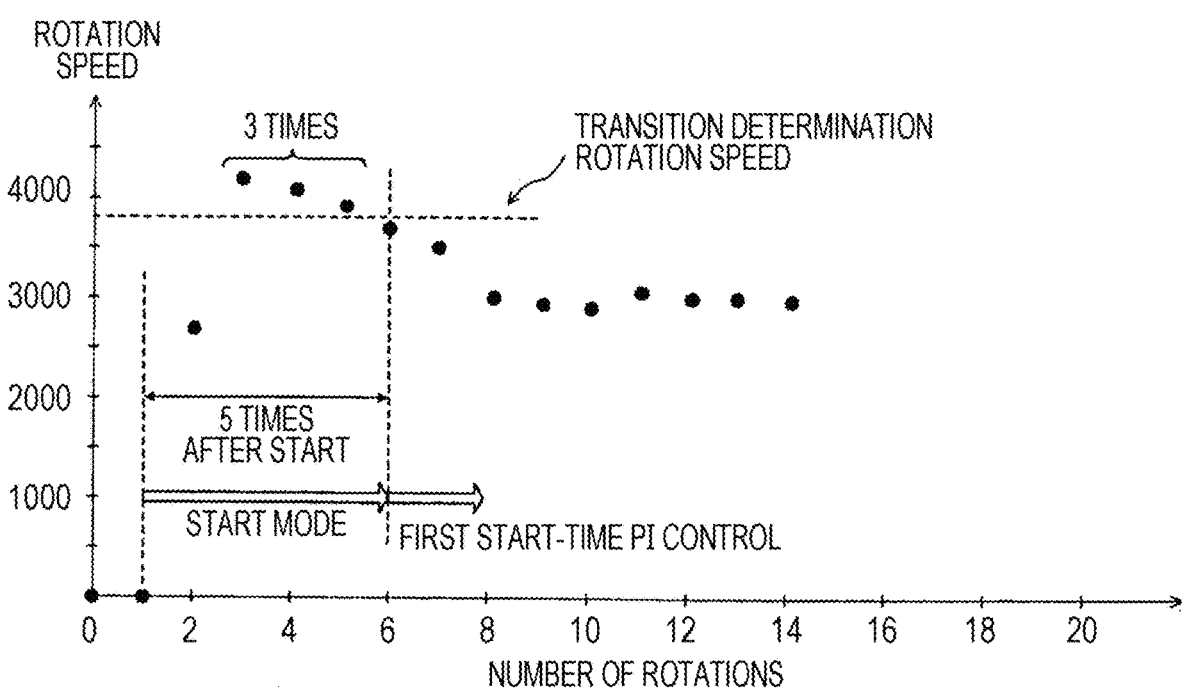
FIG. 5 is a graph for showing an example of a relationship between a timing at which a rotation speed of the internal combustion engine (2) is checked and the number of rotations of the internal combustion engine (2) when the internal combustion engine (2) is to be started.
Figure 6:
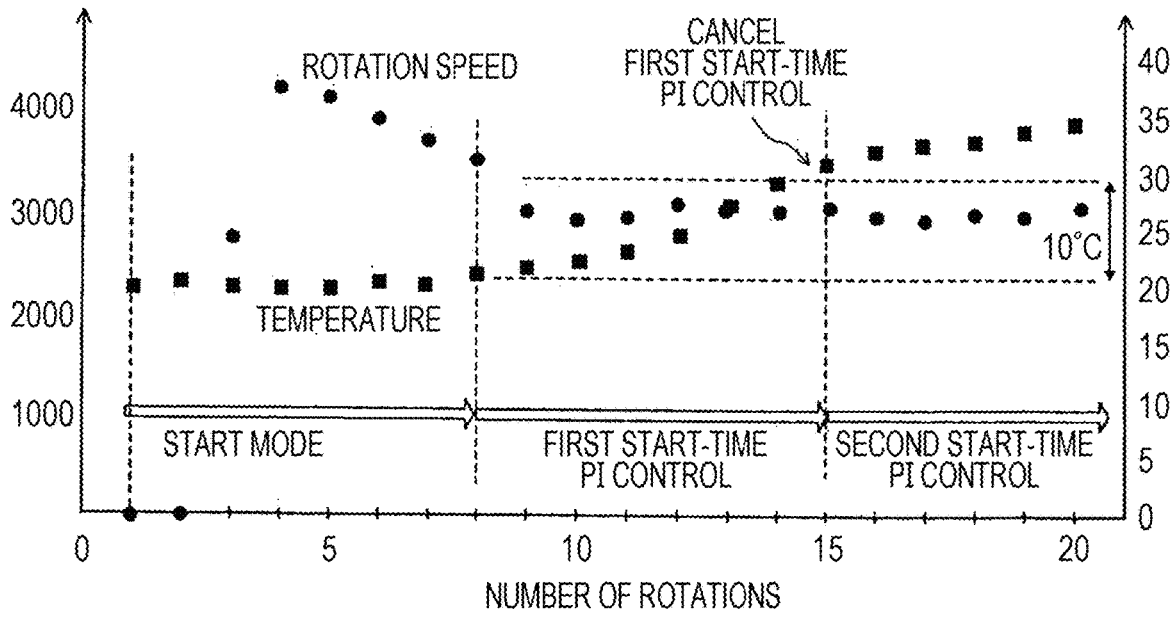
FIG. 6 is a graph for showing an example of a condition under which first start-time PI control is canceled.
Figure 7:
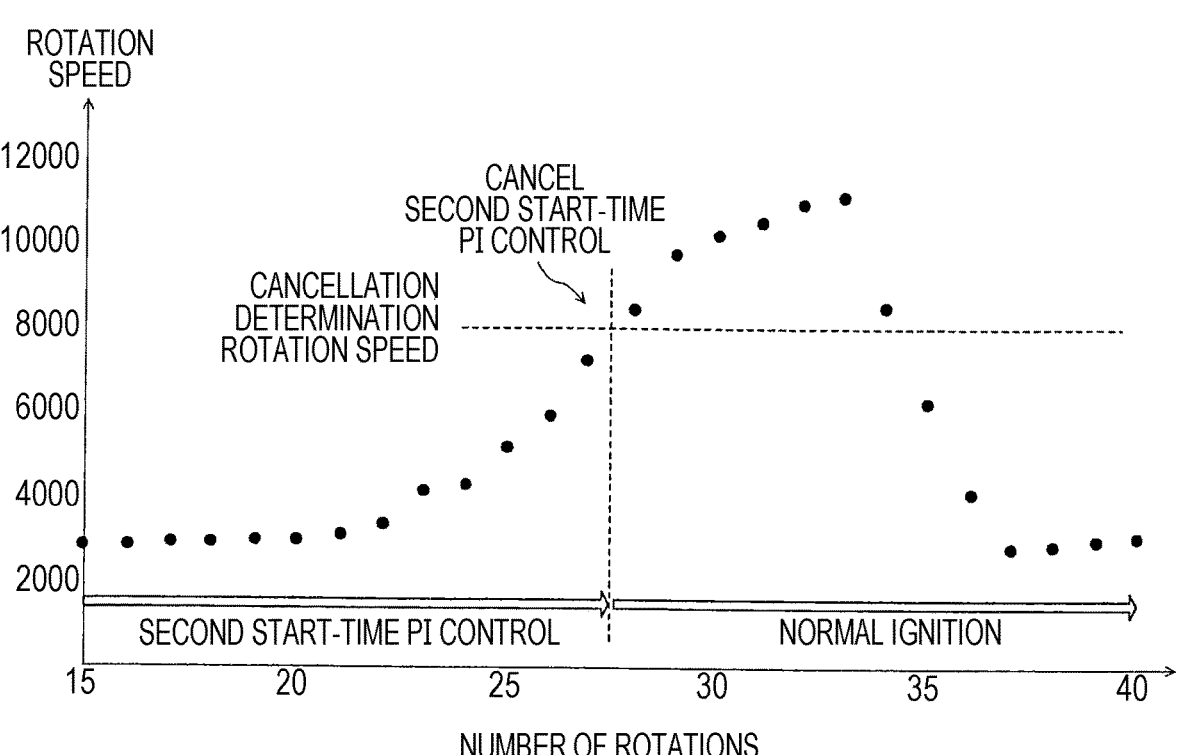
FIG. 7 is a graph for showing an example of a condition under which second start-time PI control is canceled.

FIG. 4 is a flowchart for illustrating processing of control executed when the internal combustion engine 2 is to be started. The processing of FIG. 4 is executed by the microcomputer 20. FIG. 5 is a graph for showing an example of a relationship between a timing at which the rotation speed of the internal combustion engine 2 is checked and the number of rotations of the internal combustion engine 2 in a start mode of the internal combustion engine 2. FIG. 6 is a graph for showing an example of a condition under which first start-time PI control is canceled. FIG. 7 is a graph for showing an example of a condition under which second start-time PI control is canceled.

First, the microcomputer 20 determines whether or not a PI control transition condition is satisfied (Step S411).

For example, when the number of rotations each at which the rotation speed of the internal combustion engine 2 is higher than a transition determination rotation speed within a first number of rotations immediately after the internal combustion engine 2 starts is equal to or higher than a second number of rotations, it is determined that the PI control transition condition is satisfied.

Specifically, as shown in FIG. 5, the number of rotations each at which the rotation speed of the internal combustion engine 2 is equal to or higher than 3,800 RPM (transition determination rotation speed) within five rotations (first number of rotations) immediately after the internal combustion engine 2 starts (start mode) is equal to or larger than three rotations (second number of rotations), and hence it is determined that the PI control transition condition is satisfied. As a result, the control transitions to the first start-time PI control.

The above-mentioned first number of rotations, second number of rotations, and transition determination rotation speed, and the like are examples, and can appropriately be determined in accordance with structure and characteristics of the internal combustion engine 2, for example. The transition determination rotation speed is a rotation speed lower than the clutch-in rotation speed. With this configuration, it is possible to transition to the first start-time PI control without occurrence of the clutch-in.

After that, when the PI control transition condition is satisfied (YES), the microcomputer 20 executes the first start-time PI control (Step S413). The first start-time PI control is feedback control for stabilizing the rotation speed of the internal combustion engine 2 immediately after the engine starts. Specifically, the first start-time PI control controls the internal combustion engine 2 such that the rotation speed of the internal combustion engine 2 falls within a first rotation speed range including a target rotation speed. Through the feedback control as described above, it is possible to cause the rotation speed of the internal combustion engine 2 to quickly reach the target rotation speed and then maintain the target rotation speed.

As the first start-time PI control, the proportional control and the integral control, which are feedback control, are used. However, the PID control ((the proportional control, the integral control, and the differential control) may be used or other feedback control may be used. The first start-time PI control is only required to be control which causes the rotation speed of the internal combustion engine 2 to quickly reach the target rotation speed and then maintain the target rotation speed.

After that, the microcomputer 20 determines whether or not a finish condition for the first start-time PI control is satisfied. The finish condition for the first start-time PI control can be determined based on the temperature of internal combustion engine 2, a deviation of the temperature of the internal combustion engine 2, and a time (number of rotations) in which the first start-time PI control is being executed. Based on those conditions, it is possible to determine whether or not the internal combustion engine 2 is stabilized immediately after the start. Another condition may be used as long as this condition can be used to determine the stability of the internal combustion engine 2.

Specifically, first, the microcomputer 20 determines whether or not the temperature of the internal combustion engine 2 is equal to or higher than a predetermined temperature (Step S415). The temperature of the internal combustion engine 2 can be detected by the above-mentioned temperature sensor 50.

When the temperature of the internal combustion engine 2 is lower than the predetermined temperature (NO), that is, the temperature of the internal combustion engine 2 is not sufficiently high, the microcomputer 20 determines whether or not the temperature deviation is equal to or larger than a predetermined value (Step S417). The temperature deviation can be calculated from a difference between the temperature exhibited when the first start-time PI control was started and the temperature detected by the temperature sensor 50 this time.

When the temperature deviation is within the predetermined value (NO), that is, a temperature change amount is not large, the microcomputer 20 determines whether or not a timeout has occurred (whether or not a predetermined time has elapsed or whether or not a predetermined number of rotations has been exceeded) (Step S419).

When the timeout has not occurred (NO), the microcomputer 20 returns the process to Step S413, and continues the first start-time PI control.

When the temperature of the internal combustion engine 2 is equal to or higher than the predetermined temperature (YES) in the determination processing of Step S415, when the temperature deviation is equal to or larger than the predetermined value (YES) in the determination processing of Step S417, or when the timeout has occurred in the determination processing of Step S419, the microcomputer 20 determines that the finish condition for the first start-time PI control is satisfied, and hence executes the second start-time PI control (Step S421).

For example, in the example of FIG. 6, when the temperature deviation has become equal to or larger than 10° C., the microcomputer 20 determines that the finish condition for the first start-time PI control is satisfied, and executes the second start-time PI control. Not only in the example of FIG. 6, but also when the temperature of the internal combustion engine 2 has become equal to or higher than the predetermined temperature or when the predetermined time has elapsed as described above, the microcomputer 20 can determine that the finish condition for the first start-time PI control is satisfied, and can execute the second start-time PI control.

The second start-time PI control is control for preparing for acceleration after the rotation of the internal combustion engine 2 is stabilized through the first start-time PI control. Specifically, the second start-time PI control is control of making preparation so that the internal combustion engine 2 can quickly be accelerated in accordance with work of a user. The second start-time PI control controls the internal combustion engine 2 such that the rotation speed of the internal combustion engine 2 falls within a second rotation speed range wider than the first rotation speed range of the first start-time PI control. With this configuration, it is possible to increase an allowable range of the rotation speed of the internal combustion engine 2, to thereby adapt to a quick acceleration.

As the second start-time PI control, the proportional control and the integral control, which are the feedback control, are used. However, the PID control (the proportional control, the integral control, and the differential control) may be used or other feedback control may be used. The second start-time PI control is only required to control the internal combustion engine 2 such that the rotation speed of the internal combustion engine 2 falls within the second rotation speed range.

After that, the microcomputer 20 determines whether or not a finish condition for the second start-time PI control is satisfied. The finish condition for the second start-time PI control can be determined in accordance with the rotation speed of the internal combustion engine 2 and an acceleration state of the internal combustion engine 2. Based on those conditions, it is possible to adapt the internal combustion engine 2 to a quick acceleration in accordance with the work of the user. Another condition may be used as long as the internal combustion engine 2 can adapt to a quick acceleration.

Specifically, first, the microcomputer 20 determines whether or not the rotation speed of the internal combustion engine 2 is equal to or higher than a predetermined rotation speed (Step S423).

When the rotation speed of the internal combustion engine 2 is lower than the predetermined rotation speed (NO), the microcomputer 20 determines whether or not the internal combustion engine 2 is accelerating (Step S425).

When the internal combustion engine 2 is not accelerating (NO), the microcomputer 20 returns the process to Step S421, and continues the second start-time PI control.

When the PI control transition condition is not satisfied (NO) in the determination processing of Step S411, when the rotation speed of the internal combustion engine 2 is equal to or higher than the predetermined rotation speed (YES) in the determination processing of Step S423, or when the internal combustion engine 2 is accelerating (YES) in the determination processing of Step S425, the microcomputer 20 transitions to normal ignition control (Step S427), and temporarily finishes this subroutine.

For example, in the example shown in FIG. 7, the rotation speed of the internal combustion engine 2 has become equal to or higher than 8,000 RPM, and it is then determined that the finish condition for the second start-time PI control is satisfied. As a result, the microcomputer 20 transitions to the normal ignition control. Not only in the example of FIG. 7, but also when the internal combustion engine 2 is brought into the acceleration state as described above, the micro-computer 20 may determine that the finish condition for the second start-time PI control is satisfied, and may transition to the normal ignition control.

«<Lift-up Mechanism»>

Figure 8A:
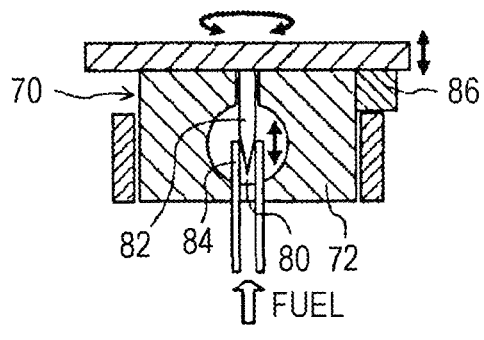
FIG. 8A is a longitudinal sectional view for illustrating structure of a carburetor (7)
Figure 8B:
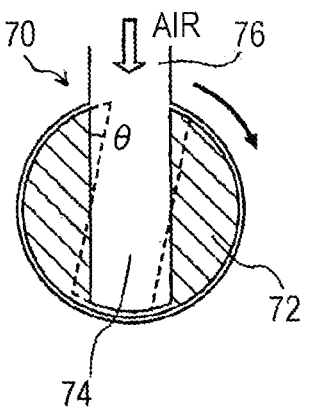
FIG. 8B is a transverse sectional view for illustrating the structure of the carburetor (7).

FIG. 8A is a longitudinal sectional view for illustrating structure of the carburetor 7 and FIG. 8B is a transverse sectional view for illustrating the structure of the carburetor 7. The carburetor 7 in the embodiment is a carburetor of the rotary throttle valve type.

The carburetor 7 includes an intake air flow rate control portion 70 and a fuel flow rate control portion 80.

«Intake Air Flow Rate Control Portion 70»

The intake air flow rate control portion 70 includes the rotatable rotary portion 72. The rotary portion 72 includes a passage 74 through which the air can pass. The passage 74 communicates with an air supply hole 76. The passage 74 communicates with the combustion chamber of the internal combustion engine 2. The air from an outside is supplied to the combustion chamber from the air supply hole 76 via the passage 74.

The rotary portion 72 is rotated by an accelerator opera-tion by the user. A direction of the passage 74 is changed in accordance with a rotation angle θ of the rotary portion 72, to thereby change a degree of overlap between the air supply hole 76 and the passage 74. An air flow rate is controlled in accordance with the degree of overlap. As described above, the air flow rate of air to be supplied to the combustion chamber of the internal combustion engine 2 can be adjusted in accordance with the rotation angle θ of the rotary portion 72. The rotary portion 72 functions as a throttle valve.

It is preferred that the opening degree of the throttle valve have a target corresponding to a rotation speed equal to or higher than the clutch-in rotation speed, for example 1.0 time to 1.6 times of the clutch-in rotation speed. With this configuration, good starting capability and good suppression controllability can be achieved. Moreover, it is more pre-ferred that the opening degree of the throttle valve have a target corresponding to a rotation speed equal to or higher than the clutch-in rotation speed, for example 1.0 time to 1.3 times of the clutch-in rotation speed. With this configuration, better starting capability and better suppression controlla-bility can be achieved.

«Fuel Flow Rate Control Portion 80»

The fuel flow rate control portion 80 includes a movable needle 82 and a fuel nozzle 84. The movable needle 82 can reciprocate in an up-and-down direction as the rotary portion 72 rotates. The movable needle 82 can operate in association with the rotary portion 72 through an operation association member 86. The operation association member 86 can be formed of, for example, a combination of cams having tapered surfaces or a combination of gears (not shown). The operation association member 86 is only required to convert a rotation motion of the rotary portion 72 to a linear motion of the movable needle 82.

A tip of the movable needle 82 is movably inserted into the fuel nozzle 84. The fuel nozzle 84 supplies the fuel to the combustion chamber of the internal combustion engine 2. The air taken into the combustion chamber from the passage 74 and the fuel discharged from the fuel nozzle 84 are mixed into the air-fuel mixture, and the air-fuel mixture is supplied to the combustion chamber of the internal combustion engine 2.

A depth of insertion into the fuel nozzle 84 is changed through the reciprocating motion of the movable needle 82. An amount of the fuel discharged from the fuel nozzle 84 can be adjusted based on the depth of insertion into the fuel nozzle 84, and hence a function as a fuel valve is imple-mented.

As described above, the rotary portion 72 and the movable needle 82 operate in association with each other through the operation association member 86. Both of the amount of the air taken into the combustion chamber from the passage 74 and the amount of the fuel discharged from the fuel nozzle 84 can simultaneously be adjusted through the operation association member 86, and hence an optimal air-fuel ratio can be set in accordance with the opening degree of the throttle valve.

Specifically, with the operation association member 86, as the rotation angle θ of the rotary portion 72 is reduced, the insertion depth of the movable needle 82 is reduced. More-over, with the operation association member 86, as the rotation angle θ of the rotary portion 72 is increased, the insertion depth of the movable needle 82 is increased. That is, it is possible to reduce the insertion depth of the movable needle 82, to thereby increase the amount of the fuel while the rotation angle θ of the rotary portion 72 is reduced, to thereby increase the amount of the air (lift up). Moreover, it is possible to increase the insertion depth of the movable needle 82, to thereby decrease the amount of the fuel while the rotation angle θ of the rotary portion 72 is increased, to thereby reduce the amount of the air.

As described above, in the configuration which associates the opening degree of the throttle valve and the fuel flow rate control with each other, the starting capability and continu-ous stability after the start of the engine are improved by setting a target of the opening degree of the throttle value to an opening degree corresponding to a rotation speed equal to or lower than twice of the clutch-in rotation speed while the clutch-in rotation speed is considered as a reference. In particular, it is preferred to set the target of the opening degree of the throttle valve to the opening degree corre-sponding to 1.0 time to 1.6 times of the clutch-in rotation speed. In this configuration, the engine rotation speed at the start is set to the rotation speed range higher than the clutch-in rotation speed, and hence it is possible to simplify a pattern of the fuel flow rate control in accordance with the air amount and the suppression control using the ignition device. For example, stable starting capability and the continuous stability after the start within a predetermined rotation speed range can be achieved by only building retardation control for an upper limit rotation speed slightly higher than the clutch-in rotation speed into the suppression control using the ignition device.

Further, it is preferred to provide such a configuration of setting the target of the opening degree of the throttle valve to an opening degree corresponding to 1.0 time to 1.3 times of the clutch-in rotation speed. With this configuration, in addition to the above-mentioned starting capability and simplified suppression control, the control of the fuel flow rate, that is, the control of the movement amount of the movable needle 82 can be minimized, and hence an increase in complexity of a carburetor main body and peripheral components can be avoided while the quick and reliable starting capability and the continuous stability after the start are maintained. Such a configuration is preferred for a portable working machine having output of engine of from 0.5 kW to 2 kW.

«<Scope of Embodiments»>

As described above, the embodiment of the present invention has been described, but it should not be understood that the description and the drawings that form a part of this disclosure limit this disclosure. This disclosure includes various embodiments and others which are not described herein.

The invention claimed is:

1. An easy engine starting system, comprising:
an engine having a carburetor;
a centrifugal clutch configured to transmit a driving force of the engine to a driven device; and
a control device configured to adjust output of the engine,
wherein, when the engine is to be started, the engine is accelerated, using control by the carburetor of an air-fuel mixture that flows into the engine, at start engine output which enables the engine to reach a rotation speed higher than a clutch-in rotation speed,
wherein the control device is configured to control the engine in a start mode, a first start-time PI control step that follows the start mode, and a second start-time PI control step that follows the first start-time PI control step, and
wherein the control device is configured to transition from the start mode to the first start-time PI control step based on a number of engine rotations, and
wherein the control device is configured to transition from the first start-time PI control step to the second start-time PI control step based on a temperature of the engine.

2. The easy engine starting system according to claim 1, wherein the carburetor includes a throttle valve configured to adjust the air-fuel mixture supplied to a combustion chamber of the engine,
wherein, at the start engine output, a throttle opening degree of the throttle valve is adjusted so as to enable the engine to reach a rotation speed higher than the clutch-in rotation speed.

3. The easy engine starting system according to claim 2, wherein the output of the engine is from 0.5 kW to 2 kW, and the throttle opening degree has a target corresponding to a rotation speed equal to or higher than the clutch-in rotation speed and equal to or lower than twice of the clutch-in rotation speed.

4. The easy engine starting system according to claim 3, wherein the throttle opening degree has a target corresponding to a rotation speed equal to or higher than the clutch-in rotation speed and from 1.0 time to 1.6 times of the clutch-in rotation speed.

5. The easy engine starting system according to claim 4, wherein the throttle opening degree has a target corresponding to a rotation speed equal to or higher than the clutch-in rotation speed and from 1.0 time to 1.3 times of the clutch-in rotation speed.

6. The easy engine starting system according to claim 1, further comprising a detection unit configured to detect the rotation speed of the engine,
wherein the control device is configured to control ignition timing in the first start-time PI control step using feedback control based on a deviation between a target rotation speed and the detected rotation speed.

7. The easy engine starting system according to claim 6, wherein the feedback control is started when at least one of the detected rotation speed, the rotation speed, or a time satisfies a predetermined condition after the engine is started.

8. The easy engine starting system according to claim 7, wherein the feedback control has:
first feedback control of executing feedback control such that the rotation speed falls within a first rotation speed range; and
second feedback control of executing, after the first feedback control, feedback control such that the rotation speed falls within a second rotation speed range wider than the first rotation speed range.

9. The easy engine starting system according to claim 8, wherein the engine includes a recoil having a rope to be pulled by hand when the engine is to be started.

10. The easy engine starting system according to claim 9, wherein the engine is a two-stroke engine mounted to a handheld blade working machine.

11. The easy engine starting system according to claim 1, wherein the control device is configured to calculate the number of engine rotations.

12. The easy engine starting system according to claim 1, wherein the control device is configured to transition from the start mode to the first start-time PI control step after a number of engine rotations at a speed exceeding a transition determination rotation speed is greater than a predetermined number, and
wherein the transition determination rotation speed is a rotation speed lower than the clutch-in rotation speed.

13. The easy engine starting system according to claim 1, wherein the control device is configured to transition from the start mode to the first start-time PI control step within a predetermined number of rotations from a user starting the engine.

14. The easy engine starting system according to claim 1, further comprising a temperature sensor coupled to the engine and configured to sense the temperature of the engine,
wherein the control device is configured to receive a signal from the temperature sensor, digitize the signal, and transition from the first start-time PI control step to the second start-time PI control step based on a predetermined increase in temperature calculated from the digitized signal.

* * * * *